United States Patent [19]

Assaf

[11] Patent Number: 4,803,846
[45] Date of Patent: Feb. 14, 1989

[54] METHOD OF AND MEANS FOR CONTROLLING THE CONDITION OF AIR IN AN ENCLOSURE

[75] Inventor: Gad Assaf, Rehovat, Israel

[73] Assignee: Geophysical Engineering Company, Seattle, Wash.

[21] Appl. No.: 600,882

[22] Filed: Apr. 16, 1984

[51] Int. Cl.⁴ ............................................. F25D 17/06
[52] U.S. Cl. ......................................... 62/94; 62/271; 237/1 R
[58] Field of Search .................. 62/89, 93, 94, 92, 271; 34/80; 237/1 R, 56; 165/909

[56] References Cited

U.S. PATENT DOCUMENTS

| | | | |
|---|---|---|---|
| 2,017,027 | 10/1935 | Forrest | 62/92 |
| 2,690,656 | 10/1954 | Cummings | 62/94 |
| 3,018,231 | 1/1962 | Valentine et al. | |
| 4,189,848 | 2/1980 | Ko et al. | 34/80 |
| 4,287,721 | 9/1981 | Robison | 62/94 |

*Primary Examiner*—Henry A. Bennet
*Attorney, Agent, or Firm*—Sandler & Greenblum

[57] ABSTRACT

Apparatus for conditioning air in an enclosure includes a reservoir of brine, a direct contact air-brine-vapor heat exchanger, a brine evaporator, and a brine circulation system for exchanging brine between the reservoir and heat exchanger, and between the reservoir and the evaporator. The apparatus also includes a condenser operatively associated with the evaporator, a primary air circulation system constructed and arranged to exchange air between the heat exchanger and the enclosure for drying the air in the heat exchanger, and a secondary air circulation system constructed and arranged to exchange air between the evaporator and the condenser for evaporating water from the brine in the evaporator. Water vapor produced by the brine evaporator is condensed in the condenser which is constructed and arranged to transfer the heat released by condensation, which is the same as the latent heat of vaporization of water evaporated from the brine by the vaporizer, to the air in the enclosure.

36 Claims, 3 Drawing Sheets

METHOD OF AND MEANS FOR CONTROLLING THE CONDITION OF AIR IN AN ENCLOSURE

This invention relates to an method of and means for controlling the condition of air in an enclosure, and more particularly, for controlling the temperature and humidity of air in an enclosure such as a greenhouse.

BACKGROUND ART

Agricultural products, such as vegetables and flowers are grown on a large scale in greenhouses throughout the world. During daylight hours, growing agricultural products introduce water vapor into a greenhouse and extract carbon dioxide from the air. Often, the addition of heat to a greenhouse on a daily basis is required depending on geographic location and season of the year. In some locations, heat is needed only at night while in other locations, heat is needed during all or part of the day. In all cases where a greenhouse is heated, some of the heat goes to evaporating water found in great abundance in a greenhouse. The vapor thus produced adds to the vapor produced by evapotranspiration of the growing products in the greenhouse with the result that the humidity in the greenhouse often approaches saturation. This is an unhealthy condition for most plants; and for many years, the solution was to open the greenhouse to ambient conditions exchanging the air in the greenhouse with ambient air that is generally cooler and dryer. Such a solution is energetically inefficient; and for this reason, attention has recently turned to utilizing direct contact air brine vapor heat exchangers in the greenhouse for the purpose of drying the air. Brine is hygroscopic because the vapor pressure at the air/brine interface at a given temperature will be less than the vapor pressure of vapor in the air at the same temperature.

One technique that might be applicable to greenhouses is disclosed in U.S. Pat. No. 4,355,683, in which air in an enclosure is passed through a drying tower where the air is contacted with a brine shower causing water vapor in the air to condense on the brine droplets thereby drying the air and producing diluted brine that must be reconcentrated before being cycled back into the tower. In this patent the latent heat of condensation added to the diluted brine during the conditioning process is rejected to the atmosphere in a heat exchanger and is thus wasted.

More efficient use of this latent heat of condensation is found in co-pending U.S. applications Ser. No. 483,741 filed Apr. 11, 1983 and Ser. No. 479,009 filed Mar. 23, 1983 which disclose temporarily storing the latent heat in the brine, and contacting the air in the enclosure with the brine during the night when the air in the enclosure will be cooler than the brine. Stored heat in the brine is thus transferred to the air in the enclosure by a reduction in the sensible heat of the brine.

In all of these techniques, reconcentration of the brine is a necessary for continuous operation. In the U.S. Pat. No. 4,355,683, this is accomplished by heating the diluted brine and contacting it with ambient air in another tower. In this situation, the vapor pressure at the air-brine interface of the heated brine will exceed the vapor pressure of ambient air with the result that water in the brine evaporates producing concentrated brine that is returned to the tower associated with the enclosure. The heat input in the regeneration process is the latent heat of evaporation of the water removed from the brine; and, needless to say, none of this heat is recovered. This is the situation in all techniques presently known for concentrating brine used to condition the air in an enclosure; and it is an object of the present invention to provide a new and improved method of a means for conditioning air in an enclosure using an air-brine-vapor heat exchanger wherein heat used to reconcentrate the brine is transferred to the enclosure rather than wasted.

DISCLOSURE OF INVENTION

The apparatus in accordance with the present invention for conditioning the air in an enclosure includes a reservoir of brine, a direct contact air-brine-vapor heat exchanger, a brine evaporator, and a brine circulation system for exchanging brine between the reservoir and heat exchanger, and between the reservoir and the evaporator. The apparatus according to the present invention also includes a condenser operatively associated with the evaporator, a primary air circulation system constructed and arranged to exchange air between the heat exchanger and the enclosure for drying the air in the heat exchanger, and a secondary air circulation system constructed and arranged to exchange air between the evaporator and the condenser for evaporating water from the brine in the evaporator. Water vapor produced by the brine evaporator is condensed in the condenser which is constructed and arranged to transfer the heat released by condensation, which is the same as the latent heat of vaporization of water evaporated from the brine by the vaporizer, to the air in the enclosure.

In one embodiment of the invention, the latent heat of vaporization contained in the water vapor produced by the evaporator, is transferred to the brine in the reservoir thus warming the brine which, when circulated into the heat exchanger, heats the air in the enclosure. In another embodiment, the latent heat of vaporization is transferred directly to the air in the enclosure rather than to the ambient atmosphere.

Preferably, the evaporator is a second direct contact air-brine-vapor heat exchanger; and a heater is operatively associated with the evaporator for establishing the vapor pressure at the air/brine interface at a level greater than the vapor pressure in the air contacted with the brine. This situation ensures that water will be evaporated from the brine into the air in the evaporator. The heat input to the evaporator is thus the heat of vaporization of water extracted from the diluted brine; and this heat is returned to the enclosure, either by way of heating the brine supplied to the heat exchanger, or by directly heating the air in the enclosure, thus providing an energetically efficient operation.

In one embodiment of the present invention, the air-brine-vapor heat exchanger includes a generally cylindrical porous member, and a header above the member for receiving brine from the reservoir and metering its flow such that a thin film of brine flows downwardly on the member and drips into the reservoir which is a tank located beneath the heat exchanger. The primary air circulation system draws air from the enclosure through the member such that the drawn air is contacted with the film of brine on the member and is dried thereby.

The evaporator, in this embodiment, comprises a generally cylindrical porous member concentric with and contained within the porous member of the heat exchanger, and a header associated with and located above the evaporator member for receiving brine from the central region of the reservoir which is heated. The header meters the flow of warmed brine such that a thin film flows downwardly on the evaporator member and drips into the central region of the reservoir. The condenser includes a heat conductive, non-porous, sleeve concentric with and contained between the heat exchanger and the evaporator members, and a header associated with and located above the sleeve for receiving cooler brine from the reservoir and depositing it only on the outside of the sleeve. The lower edge of the sleeve extends into the brine reservoir and terminates below the surface. A cover on the header associated with the sleeve segregates the air in the evaporator/condenser from the air in the enclosure. As a consequence, the second air circulation system is effective to circulate air between the tubular region defined by the porous member of the evaporator and the annular region defined by the porous member of the evaporator and and the non-porous sleeve of the condenser. Air passing through this member absorbs vapor from the film of warm brine on the member and is warmed thereby. The brine on the porous member is cooled and concentrated, and drips into the central region of the reservoir. Being heavier, the dripping brine sinks to the bottom of the reservoir and is available for recycling to the heat exchanger.

The warmed and moistened air that enters into the annular region of the condenser contains two components of heat: the latent heat of vaporization of the vapor evaporated from the brine in the vaporizer, and sensible heat absorbed from the warm brine flowing on the porous member. Vapor in the warm moist air condenses on the inner surface of the cooler sleeve thus returning to the sleeve the latent heat of evaporation as well as some sensible heat in the air. This heat is conducted through the sleeve and warms the cooler brine on the outer surface of the sleeve which then drips into the reservoir raising the temperature thereof. When the so heated brine is returned to the heat exchanger, it serves to heat as well as dry the air in the enclosure. Thus, this embodiment provides a particularly efficient way to continuously dry and heat the air in an enclosure as well as to regenerate brine that is used in the drying process.

In another embodiment of the present invention, the evaporator-condenser includes a closed conduit containing air separate from the air in the enclosures, such conduit having a heat transfer wall in contact with the air in the enclosure. In this embodiment, the second air circulation system circulates air in the closed conduit within which the air is heated before contacting an air-brine-vapor heat exchanger such that the air is moistened by the evaporation of water from the brine. The warm moist air contacts the heat transfer wall thereby transferring heat to the air in the enclosure and at the same time producing condensate which can be collected and drained from the system. The thus concentrated brine is returned to the reservoir.

BRIEF DESCRIPTION OF DRAWINGS

Embodiments of the invention are shown in the accompanying drawings wherein.

DETAILED DESCRIPTION

Figure 1:
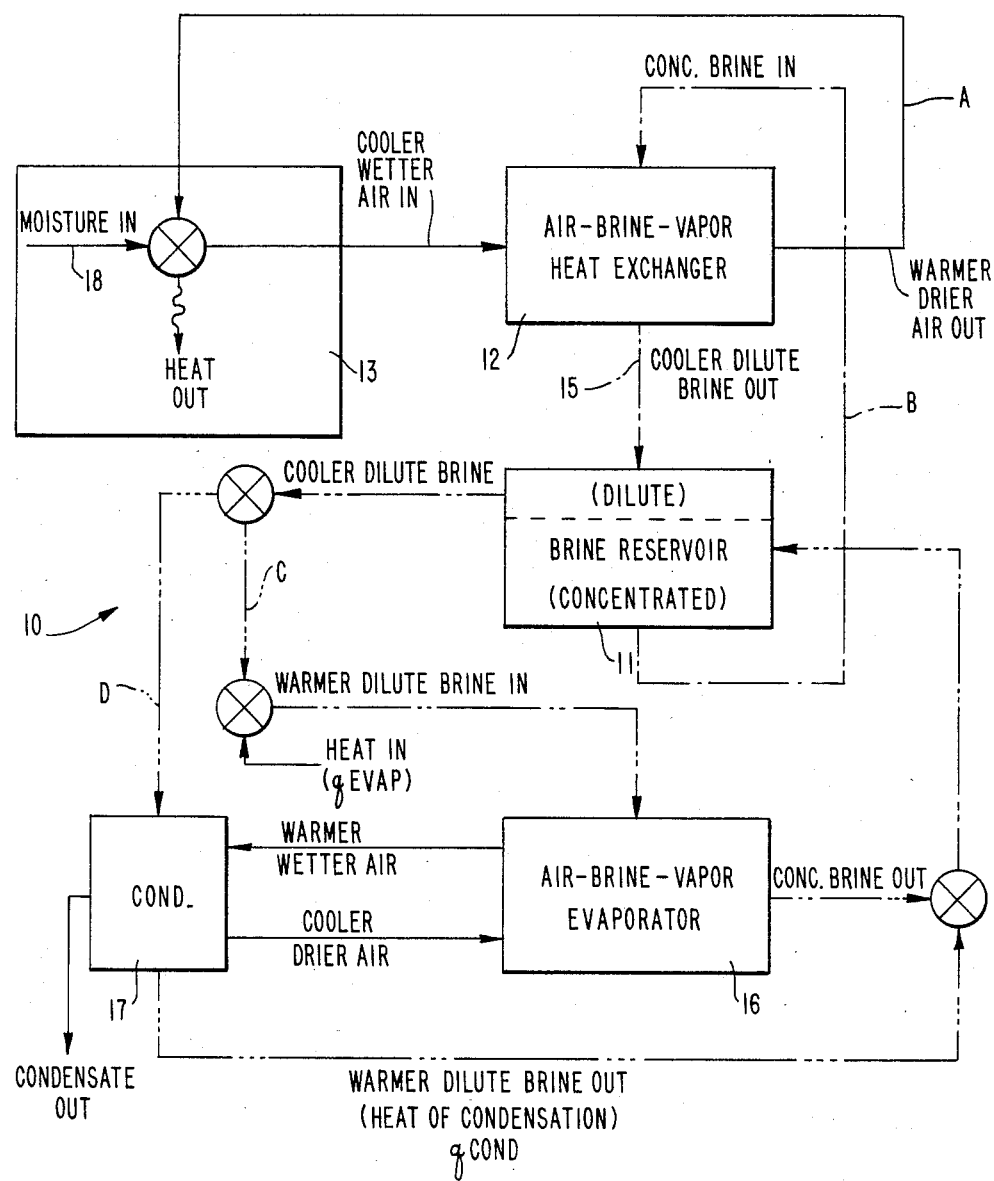
FIG. 1 is a schematic block diagram of one embodiment of the present invention illustrating the conditioning of air in an enclosure in a manner that returns to the enclosure the heat required to reconcentrate the brine.

Referring now to FIG. 1 of the drawings, reference numeral 10 designates a system, in schematic form, in accordance with the present invention for conditioning air in an enclosure. System 10 comprises reservoir 11 containing brine and direct contact air-brine-vapor heat exchanger 12. By means of a pump (not shown) brine is exchanged between reservoir 11 and heat exchanger 12 in a known manner. The heat exchanger may produce a spray of droplets of brine, or it may produce a thin film of brine that flows on a permeable surface. In either case, a primary air circulation system exchanges air between enclosure 13 and heat exchanger 12. Within enclosure 13, which may be a greenhouse, for example, moisture is present and heat is absorbed from the air in the greenhouse to evaporate this moisture. In addition, the evapotranspiration of the plants in the enclosure produce additional vapor. For this reason, the air entering heat exchanger 12 is more moist than the air leaving the heat exchanger.

In heat exchanger 12, brine at a temperature warmer than the air therein is contacted by the brine. Under these conditions, the vapor pressure at the air-brine interface in heat exchanger 12 is less than the vapor pressure of the air. Consequently, vapor in the air condenses on the brine thus drying the air, which is returned to the enclosure, and diluting the brine, which is returned to the reservoir. Considering primary air circulation loop A in relation to the heat exchanger, cooler, wetter air enters the heat exchanger and warmer, drier air exits; and considering primary brine circulation loop B in relation to the heat exchanger, warmer, concentrated brine enters the heat exchanger and cooler, more dilute brine exits.

In order to regenerate the brine (i.e., make the brine in the reservoir more concentrated by evaporating water absorbed in the heat exchanger), evaporator 16 is utilized. This evaporator is a direct contact air-brine-vapor heat exchanger much like heat exchanger 12 in the sense that either a brine shower or a brine film is provided in contact with air which comes from enclosure 13. In order to evaporate the water from the dilute brine that is inputted to evaporator 16, heat is added to the system either by heating the diluted brine before its application to the evaporator, or by heating the air either before it enters the evaporator or within the evaporator. In either case, this arrangement will ensure that the vapor pressure at the air/brine interface in the evaporator will exceed the vapor pressure of the air in the evaporator; and water in the brine will evaporate producing more concentrated brine, and the air exiting from the evaporator will carry the evaporated water to condenser 17.

As shown in FIG. 1, secondary brine loop C includes a heater for heating brine drawn from the reservoir before the brine enters the evaporator. Considering loop C in relation to the evaporator, warmer, more dilute brine enters the evaporator, and cooler, more concentrated brine exits to the reservoir.

A secondary air circulation system, separate from the primary air circulation system, exchanges air between the evaporator and the condenser; and tertiary brine loop D exchanges brine between the reservoir and the condenser which is a closed, indirect contact heat exchanger in which the air and brine exchanger heat through a heat transfer medium. Cool brine from the reservoir condenses water vapor from the air entering the condenser and absorbs the heat of condensation of the condensate and some sensible heat from the air before returning to the reservoir. The air in the condenser is thus cooled and dried before being returned to the evaporator. Considering the secondary air circulation loop in relation to the condenser, warmer, wetter air enters 9the condenser and cooler, drier air exits. Considering the tertiary brine loop in relation to the condenser, cooler dilute brine enters the condenser, and warmer brine of the same concentration exits. However, the increase in sensible heat of the brine in loop D arises, in part, from a transfer to the brine of the latent heat of condensation of the water vapor in the condenser. This heat is equal to the latent heat of vaporization of the water removed from the brine in the vaporizer, and is returned to the reservoir. Thus, the brine in loop B associated with heat exchanger 12 contains all of the heat required to reconstitute the brine after its dilution in the heat exchanger. In other words, condenser 17 rejects heat to the enclosure rather than to the ambient atmosphere which was the case prior to the present invention. As a consequence, the present invention, as depicted in schematic form in FIG. 1, is very energy efficient.

Figure 2:
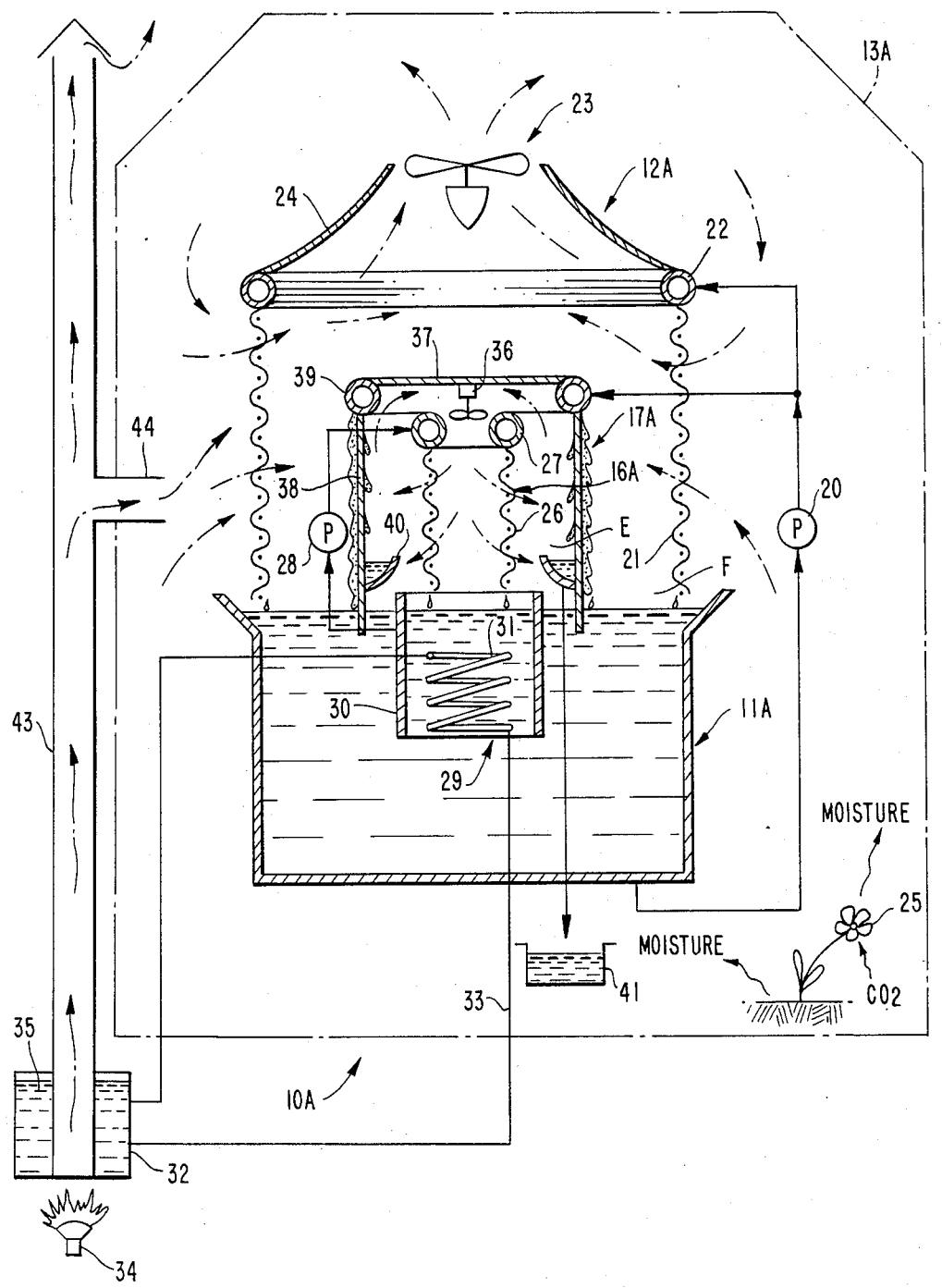
FIG. 2 is a block diagram of the preferred embodiment of the present invention based on the schematic of FIG. 1 wherein the heat of vaporization required to reconcentrate the brine is returned to the brine for transfer to the enclosure.

A specific embodiment of the invention shown in FIG. 1 is illustrated in FIG. 2 to which a reference is now made. System 10A shown in FIG. 2 comprises direct contact, air-brine-vapor heat exchanger 12A located directly above reservoir 11A, brine contained in the reservoir being exchanged with the heat exchanger by means of pump 20. Heat exchanger 12A comprises a generally cylindrical porous member 21 supported from circular header 22 which itself is suitably supported within enclosure 13A. Member 21 may be in the form of a woven mat, or compressed fibrous material, for example. It will have almost no structural strength, but may be provided with a reenforcing cage (not shown) for maintaining its shape in the face of air flow which is described below.

Header 22 is, in effect, tubular and has apertures along its lower periphery for the purpose of providing a dripping type of flow path for concentrated brine that is supplied to the header by pump 20. The apertures in header 22 serve to meter the flow of brine to member 21 such that a thin film of brine flows downwardly on the member and drips into reservoir 11A. Motor driven fan 23, suitably supported in venturi mounting 24 attached to a header 22, serves as the primary air circulation system, and creates a circulation of air in enclosure 13 through member 21. As a consequence, air from the enclosure is drawn through member 21 such that the drawn air is contacted with the film of brine on member 21 and is dried thereby.

As shown schematically in FIG. 2, growing plants 25 in enclosure 13A, and soil and other material in the enclosure, produce moisture that is taken up in the air in the enclosure thus requiring the drying operation carried out by heat exchanger 12A. This drying operation is achieved by evaporator 16A which comprises generally cylindrical porous member 26 constructed much the same as member 21 of heat exchanger 12A. In addition, evaporator 16A includes header 27 in the form of a tube that is circular in shape and approximately the same size as the cylinder defined by member 26. Header 27 is tubular and is similar to tubular header 22 associated with the heat exchanger and likewise contains a series of holes for metering brine to member 26.

Brine is furnished to header 27 by pump 28 which is connected to segregated region 29 in reservoir 11A. Specifically, region 29 is defined by circular sleeve 30 which is concentric with the axis of heat exchanger 12A and evaporator 16A, and is suitably supported in the reservoir adjacent to the surface thereof. The top of this sleeve extends above the surface of the reservoir; and both the top and bottom are open. Brine within this segregated region is heated by heating coils 31 connected to boiler 32 by pipes 33. Burning of fuel by burner 34 heats water 35 contained within the boiler; and heated water is circulated through coils 31 locally heating the brine contained in segregated region 29 defined by sleeve 30.

Heated brine from the segregated region applied by pump 28 to header 27 exits therefrom through the small apertures in this header thus metering the flow of brine to member 26 such that a thin film of brine flows downwardly on member 26 and then drips into segregated region 29.

Finally, the system shown in FIG. 2 includes condenser of 17A in the form of heat conductive sleeve 38 which is concentric with and contained in the annular region between heat exchanger and evaporator members 21 and 26, respectively. The lower free end of this sleeve is immersed in the brine of the reservoir. Header 39 supported above sleeve 38 is supplied with brine from reservoir 11A by pump 20, and delivers brine only to the outer surface of the sleeve. Such brine drains on the outer surface of the sleeve into the reservoir. Cover 37 affixed to header 39 closes the top of sleeve 38 and defines air chamber E separate from air chamber F which is constituted by the interior of heat exchanger 12A. Fan 36 affixed to cover 37 establishes a secondary air circulation system that exchanges air between evaporator 16A and condenser 17A. Thus, fan 36 pushes air from the interior of porous member 26 of the evaporator, through the member, and into the annular region defined by the porous member and sleeve 38 of the condenser. The brine flowing downwardly on porous member 26 is warmer than the air flowing through the member; and the result is that water in the brine is evaporated by the air whose temperature is also raised by the absorption of sensible heat from the brine. The relatively warm and moist air that exits from the vaporizer contacts the relatively cool walls of sleeve 38 causing condensation of vapor on the inner surface of the sleeve. Thus, much of the heat absorbed by the air in evaporating and concentrating the brine is transferred through sleeve 38 to the brine flowing downwardly on the exterior of sleeve 38. This heat is carried by the runoff from the sleeve into the reservoir where it eventually is returned to the enclosure through the return of brine to heat exchanger 12A.

Condensate on the inner surface of sleeve 38 flows downwardly and is collected in gutters 40 for transfer to condensate storage 41 via conduit 42. Brine that flows downwardly on the outer surface of sleeve 38 is returned to reservoir 11A as shown in FIG. 2. Concentrated brine dripping from member 26 into segregated region 29 is more dense than brine therein, and consequently sinks to the lower portion of the reservoir below segregated region 29 and becomes available for being transferred by pump 20 to heat exchanger 12A.

In order to supply additional heat to enclosure 13A and to supply the enclosure with excess carbon dioxide needed for enhancing plant growth in the enclosure, flue gases produced by burner 34 are piped through stack 43 and vented by pipe 44 to the interior of the enclosure.

In operation, growing plants 25 and the soil in which the plants are growing produce moisture that is taken up by the air in the enclosure. The moisture is carried by the air in enclosure 13A through member 21 of heat exchanger 12A in direct contact with concentrated brine thus drying the air. The heat of condensation of the water extracted from the air is transferred to the diluted brine which is returned to the reservoir. Air, in a conduit separate from the air exchanged between the enclosure and the heat exchanger for drying and warming the air in the enclosure, is exchanged between the vaporizer and the condenser. This air absorbs water from the warm brine inputted to the vaporizer producing concentrated brine; and the vapor in the air is condensed in the condenser transferring heat to brine circulated through the condenser out of direct contact with the air. The heat of vaporization added to the air to concentrate the brine is recovered by the brine and returned to the enclosure.

Figure 3:
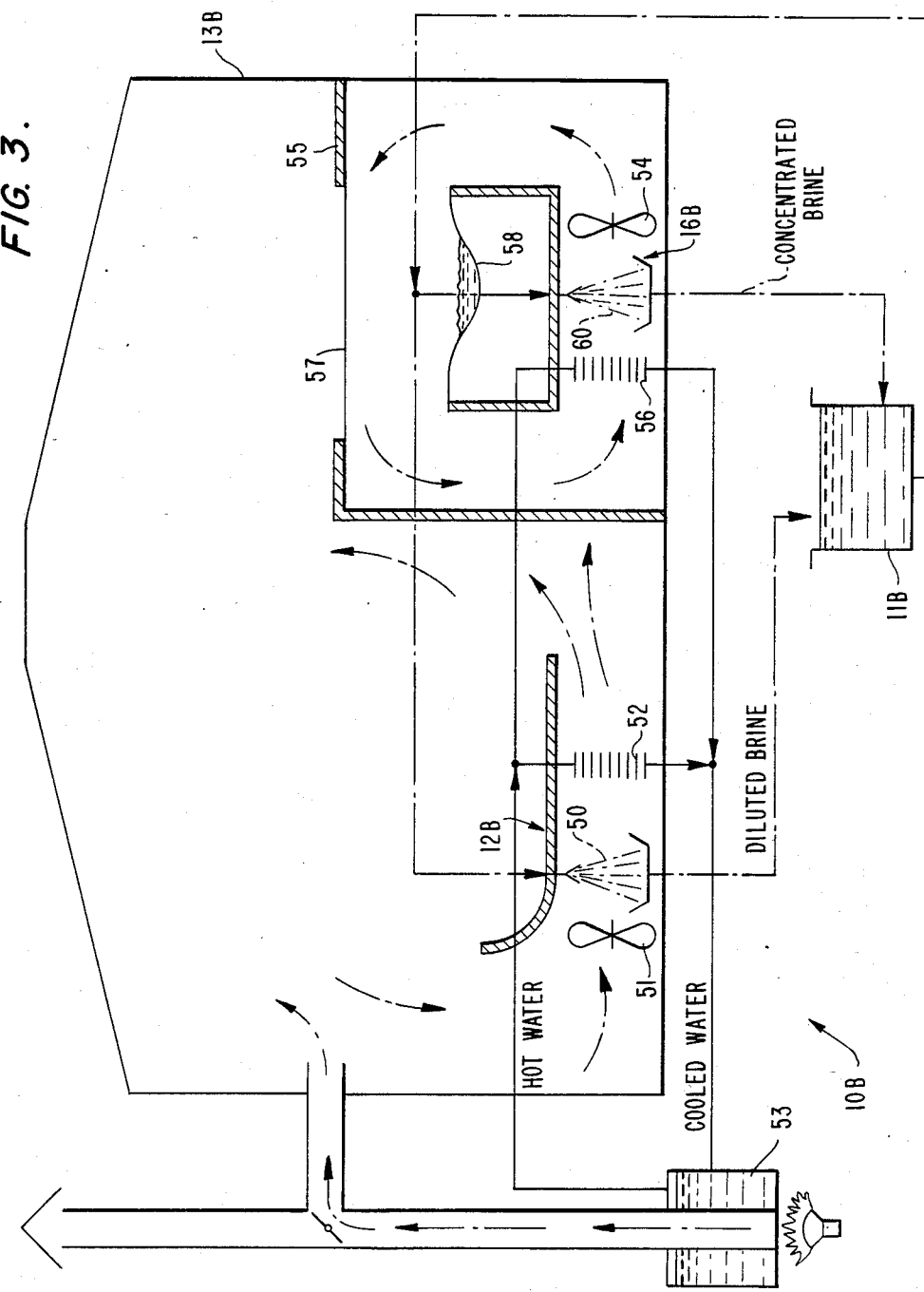
FIG. 3 is a second embodiment of the present invention wherein the heat of vaporization required to reconcentrate the brine is returned directly to the air in the enclosure.

System 10B shown in FIG. 3 is another embodiment of the present invention; but in this embodiment, the air associated with the evaporator is heated rather than the brine as in the case of system 10A. As shown in FIG. 3, system 10B includes heat exchanger 12B which includes brine shower 50 which is in direct contact with air circulating in enclosure 13B by reason of the operation of fan 51. Spray 50 shown in FIG. 3 is merely illustrative of a direct contact heat exchanger. Techniques other than sprays can be used, however. For example, the technique shown in FIG. 2 can be used to extract moisture from the air in enclosure 13B.

If conditions warrant, air that exits from the direct contact heat exchanger is warmed by passing over finned tubes 52 through which heated water produced by boiler 53 circulates. This is optional and depends upon the geographic location of the enclosure and other considerations. In any event, heat exchanger 12B serves to dry air in enclosure 13B.

Brine for shower 50 is obtained from reservoir 11B by means of a pump (not shown). Diluted brine, contained in a catch basin associated with spray 50, is returned to the top of reservoir 11B; and concentrated brine, for spray 50, is drawn from the lower region of the reservoir.

In order to regenerate the brine, evaporator 16B is utilized. This evaporator can be a direct contact spray of brine, or a thin film evaporator of the type shown in FIG. 2. Fan 54 circulates air in enclosed conduit 55 which is separate from enclosure 13B. That is to say, the air that is circulated in conduit 55 by the operation of fan 54 is separate from, and does not mix with air in enclosure 13B which is circulated by the operation of fan 51.

Upstream of the evaporator 16B are finned heat exchanger tubes 56 which are supplied with hot water produced by boiler 53 for the purpose of heating the air in conduit 55 before the air contacts brine shower 60 of evaporator 16B. As a consequence of this arrangement, the brine from reservoir 11B delivered to brine shower 60 loses water to the warmer air in conduit 55, and the resultant concentrated brine is returned to the reservoir.

Conduit 55 is provided with heat transfer wall 57 in contact with the air in enclosure 13B. Specifically, heat transfer wall 57 may be in the form of a plastic film which maintains the isolation between the air circulating in conduit 55 and the air in enclosure 13B but permits heat contained in the air in conduit 55 to be transferred to the air in enclosure 13B. Such heat transfer takes place across the film, and condensation takes place on the film. The latent heat of condensation of the condensate is thus transferred to the air in enclosure 13B, and the condensate drips down into collector 58 where it can be drawn off or thrown away.

As in the case with the embodiment shown in FIG. 2, flue gases produced by boiler 53 can be piped into the interior of enclosure 13B for the purpose of providing additional heat and excess carbon dioxide for plants growing therein. This feature, while often desirable, does not contribute to the energy savings associated with conduit 55 and heat transfer wall 57. The energy improvement achieved with the present invention arises because practically all of the heat which is added to the air in conduit 55 for the purpose of evaporating water from the brine is returned to the enclosure rather than injected to the ambient atmosphere as is the case with the known prior art.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. In a system for conditioning air in an enclosure comprising a reservoir of brine, a direct contact air-brine-vapor heat exchanger operable to exchange brine with the reservoir for condensing vapor from the air in the enclosure on the brine thereby diluting the same, and a brine regenerator that exchanges brine with the reservoir for evaporating water from the brine into segregated air separate from the air in the enclosure thereby concentrating the brine, the improvement comprising: apparatus constructed and arranged to return substantially all of the heat of vaporization of water evaporated in the regenerator to the air in the enclosure concurrently with the operation of said direct contact heat exhanger, said apparatus including a condenser for receiving vapor produced when water is evaporated from the brine, the condenser being in heat exchange relationship with the brine in the reservoir for heating the same when the vapor condenses.

2. The improvement of claim 1 wherein said apparatus includes a condenser for receiving vapor produced when water is evaporated from the brine, the condenser being in heat exchange relationship with the brine in the reservoir for heating the same when the vapor condenses.

3. The improvement of claim 1 wherein said apparatus is further constructed and arranged to return latent heat of condensation of vapor condensed by the air-brine-vapor heat exchanger to the air in the enclosure.

4. A method for conditioning air in an enclosure comprising:

(a) contacting air in the enclosure with brine exchanged with a reservoir of brine for drying the contacted air by condensing water vapor therefrom thereby producing diluted brine;

(b) contacting brine exchanged with the reservoir with air segregated from the air in the enclosure for concentrating the contacted brine by evaporating water therefrom thereby producing moistened air segregated from the air in the enclosure; and (c) condensing water vapor from said moistened air and returning substantially all of the heat of condensation thereof to the air in the enclosure concurrently with carrying out step (a) by transferring said heat of condensation directly to the brine in the reservoir.

5. A method according to claim 4 wherein the air into which water is evaporated to concentrate the brine is separate from air in the enclosure.

6. A method according to claim 4 wherein said heat of condensation is transferred directly to the air in the enclosure.

7. A method according to claim 4 wherein the latent heat of condensation of water vapor produced when the air in the enclosure is dried is returned to the air in the enclosure.

8. Apparatus for conditioning air in an enclosure comprising:

(a) a reservoir of brine;

(b) a direct contact air-brine-vapor heat exchanger and a brine evaporator;

(c) a brine circulation system operable to effect simultaneous exchange of brine between the reservoir and the heat exchanger, and between the reservoir and the evaporator;

(d) a condenser operatively associated with the evaporator;

(e) a primary air circulation system for exchanging air between the heat exchanger and the enclosure for drying the air contacted in the heat exchanger;

(f) a secondary air circulation system segregated from the primary air circulation system for exchanging air between the evaporator and the condenser for evaporating water from the brine contacted in the evaporator; and (g) means for returning substantially all of the heat of vaporization of water evaporated from the brine to the air in the enclosure while said brine circulation system is operated without mixing the air from said secondary air circulation system with the air of the primary air circulation system;

(h) said condenser being constructed and arranged to reject heat into the brine in the reservoir.

9. Apparatus according to claim 8 wherein the condenser is constructed and arranged to reject heat directly into the enclosure.

10. Apparatus according to claim 8 wherein the condenser is constructed and arranged to reject heat into the reservoir.

11. Apparatus according to claim 8 wherein the evaporator is a second, direct contact air-brine-vapor heat exchanger.

12. Apparatus according to claim 11 including a heater for increasing the vapor pressure at the air/brine interface of the brine contacted in the evaporator relative to the vapor pressure of the air contacted in the evaporator.

13. Apparatus according to claim 12 wherein the brine contacted in the evaporator is heated before being contacted with air.

14. Apparatus according to claim 12 wherein the air contacted in the evaporator is heated before being contacted with the brine.

15. Apparatus according to claim 13 wherein the condenser is cooled with brine from the reservoir.

16. Apparatus according to claim 13 wherein flue gases from the heater are vented into the enclosure.

17. Apparatus for conditioning air in an enclosure comprising:

(a) a reservoir of brine;

(b) a direct contact air-brine-vapor heat exchanger and a brine evaporator in the form of a second, direct contact air-brine-vapor heat exchanger;

(c) a brine circulation system for exchanging brine between the reservoir and the heat exchanger, and between the reservoir and the evaporator;

(d) a condenser operatively associated with the evaporator;

(e) a primary air circulation system for exchanging air between the heat exchanger and the enclosure for drying the air contacted in the heat exchanger;

(f) a secondary air circulation system for exchanging air between the evaporator and the condenser for evaporating water from the brine contacted in the evaporator; and (g) means for transferring the heat of vaporization of water evaporated from the brine to the air in the enclosure;

(h) a heater for increasing the vapor pressure at the air/brine interface of the brine contacted in the evaporator relative to the vapor pressure of the air contacted in the evaporator; and (i) wherein the brine-vapor heat exchanger comprises a generally cylindrical, porous member, and a header above the member for receiving brine from a reservoir and metering the flow of brine to the member such that a thin film of brine flows downwardly on the member, said primary air circulation system being constructed and arranged to draw air from the enclosure through the member such that the drawn air is contacted with the film of brine on the member and is dried thereby.

18. Apparatus according to claim 17 wherein the reservoir is a tank located below the member of said heat exchanger for receiving brine therefrom.

19. Apparatus according to claim 17 wherein the evaporator comprises a generally cylindrical porous member concentric with and contained within the porous member of said heat exchanger, and a header above the evaporator member for receiving heated brine and metering the flow thereof such that a thin film of brine flows downwardly on the evaporator member, said secondary air circulation system being constructed and arranged to draw air through the evaporator member such that the drawn air is contacted with the film of brine on the evaporator member and is moistened thereby.

20. Apparatus according to claim 19 wherein the condenser includes a heat conductive sleeve concentric with and contained in the annular region between the heat exchanger and the evaporator members, and a header associated with and located above the sleeve for receiving brine from the reservoir and directing the received brine only to the exterior of said sleeve thereby maintaining the sleeve at a temperature below the temperature of the air that exits from the evaporator member.

21. Apparatus according to claim 20 wherein the sleeve is non-porous such that condensate on the inside of the sleeve is separate from liquid on the outside.

22. Apparatus according to claim 21 including means for diverting condensate on the inside of the sleeve from the reservoir of brine.

23. Apparatus according to claim 21 including means for segregating the primary and secondary air systems so that the air exchanged between the heat exchanger and the enclosure is separate from the air exchanged between the evaporator and the condenser.

24. Apparatus according to claim 23 wherein said means for segregating includes a cover on the header associated with said sleeve, and an extension of the lower edge of said sleeve into the brine contained in the tank therebelow.

25. Apparatus according to claim 22 wherein said heater is in the form of heat exchange coils located in a cylindrical tube which itself is at least partially submersed in said tank, said tube being concentric with the evaporator and heat exchanger members and of a diameter larger than the diameter of the evaporator member, but smaller than the diameter of said sleeve.

26. Apparatus for conditioning air in an enclosure comprising:
(a) a reservoir of brine;
(b) a direct contact air-brine-vapor heat exchanger and a brine evaporator in the form of a second, direct contact air-brine-vapor heat exchanger;
(c) a brine circulation system for exchanging brine between the reservoir and the heat exchanger, and between the reservoir and the evaporator;
(d) a condenser operatively associated with the evaporator;
(e) a primary air circulation system for exchanging air between the heat exchanger and the enclosure for drying the air contacted in the heat exchanger;
(f) a secondary air circulation system for exchanging air between the evaporator and the condenser for evaporating water from the brine contacted in the evaporator;
(g) means for transferring the heat of vaporization of water evaporated from the brine to the air in the enclosure;
(h) a heater for heating the air prior to its contact with the brine to decrease the vapor pressure of the air in the evaporator; and
(i) a closed conduit containing air separate from the air in the enclosure, said conduit having a heat transfer wall in contact with the air in the enclosure.

27. An apparatus according to claim 26 including forced air means for circulating air in the closed conduit.

28. An apparatus according to claim 27 including means for collecting liquid that condenses on said heat transfer wall.

29. Apparatus for conditioning air in an enclosure comprising:
(a) a reservoir of brine;
(b) a direct contact air-brine-vapor heat exchanger and a brine evaporator in the form of a second, direct contact air-brine-vapor heat exchanger;
(c) a brine circulation system including a single pump for exchanging brine between the reservoir and the heat exchanger, and between the reservoir and the evaporator;
(d) a condenser operatively associated with the evaporator;
(e) a primary air circulation system for exchanging air between the heat exchanger and the enclosure for drying the air contacted in the heat exchanger;
(f) a secondary air circulation system for exchanging air between the evaporator and the condenser for evaporating water from the brine contacted in the evaporator;
(g) means for transferring the heat of vaporization of water evaporated from the brine to the air in the enclosure; and
(h) means for decreasing the vapor pressure of the air in the secondary system relative to the vapor pressure of the contacted brine at the air/brine interface.

30. Apparatus according to claim 29 including means for separating the primary and secondary air system so that air exchanged between the heat exchanger and the enclosure is separate from the air exchanged between the evaporator and the condenser.

31. Apparatus according to claim 29 wherein said condenser includes a heat transfer wall in contact with the air in the enclosure.

32. Apparatus according to claim 31 wherein said means for separating the primary and secondary air systems comprises a closed circuit, and wherein said heat transfer wall is part of said closed system.

33. Apparatus according to claim 31 including means for collecting liquid that condenses on said heat transfer wall.

34. Apparatus according to claim 32 including forced air means for circulating air in the closed circuit.

35. A system for conditioning air in an enclosure comprising:
(a) a single reservoir of brine;
(b) a direct contact air-brine-vapor heat exchanger;
(c) a single pump operable to exchange brine with the reservoir for condensing vapor from the air in the enclosure on the brine thereby diluting the same;
(d) a brine regenerator that exchanges brine the the reservoir for evaporating water from the brine into segregated air separate from the air in the enclosure thereby concentrating the brine;
(e) apparatus constructed and arranged to return substantially all of the heat of vaporization of water evaporated in the regenerator to the air in the enclosure concurrently with the operation of said direct contact heat exchanger; and
(f) wherein said apparatus includes a condenser for receiving vapor produced when water is evaporated from the brine, the condenser being in heat exchange relationship with the brine in the reservoir for heating the same when the vapor condenses.

36. Apparatus for conditioning air in an enclosure comprising:
(a) a reservoir of brine;
(b) a first direct contact air-brine-vapor heat exchanger, and a brine evaporator in the form of a second, direct contact air-brine-vapor heat exchanger;
(c) a brine circulation system operable to effect simultaneous exchange of brine between the reservoir and said first heat exchanger, and between the reservoir and the evaporator;

(d) a condenser operatively associated with the evaporator;
(e) a primary air circulation system for exchanging air between the first heat exchanger and the enclosure for drying the air contacted in the first heat exchanger;
(f) a secondary air circulation system segregated from the primary air circulation system for exchanging air between the evaporator and the condenser for evaporating water from the brine contacted in the evaporator;
(g) means for returning substantially all of the heat of vaporization of water evaporated from the brine to the air in the enclosure while said brine circulation system is operated without mixing the air from said secondary air circulation system with the air of the primary air circulation system;
(h) a heater for increasing the vapor pressure at the air/brine interface of the brine contacted in the evaporator relative to the vapor pressure of the air contacted in the evaporator;
(i) means for heating the brine contacted in the evaporator before being contacted with air; and
(j) wherein said heater produces flue gases, and includes a means for venting flue gases from the heater into the enclosure.

* * * * *